United States Patent
Choi et al.

(10) Patent No.: US 8,001,406 B2
(45) Date of Patent: Aug. 16, 2011

(54) METHOD AND APPARATUS FOR MANAGING POWER OF PORTABLE INFORMATION DEVICE

(75) Inventors: Jin-hyeon Choi, Seoul (KR); Sung-sik Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 766 days.

(21) Appl. No.: 11/210,888

(22) Filed: Aug. 25, 2005

(65) Prior Publication Data

US 2006/0090088 A1    Apr. 27, 2006

(30) Foreign Application Priority Data

Oct. 23, 2004 (KR) .................... 10-2004-0085092

(51) Int. Cl.
    *G06F 1/32* (2006.01)
(52) U.S. Cl. ..................... 713/323; 713/340
(58) Field of Classification Search ............... 713/323, 713/340
    See application file for complete search history.

(56) References Cited

U.S. PATENT DOCUMENTS

| | | | | |
|---|---|---|---|---|
| 6,266,776 B1 * | 7/2001 | Sakai | ............. | 713/300 |
| 6,504,530 B1 * | 1/2003 | Wilson et al. | ........... | 345/173 |
| 6,816,977 B2 * | 11/2004 | Brakmo et al. | ............ | 713/323 |
| 6,948,083 B2 * | 9/2005 | Eguchi et al. | ............ | 713/323 |
| 7,176,902 B2 * | 2/2007 | Peterson et al. | ............ | 345/173 |
| 7,225,353 B1 * | 5/2007 | Wong | ............ | 713/340 |
| 2002/0112005 A1 * | 8/2002 | Namias | ............ | 709/206 |

FOREIGN PATENT DOCUMENTS

| | | |
|---|---|---|
| JP | 05-282063 | 10/1993 |
| JP | 06-175756 | 6/1994 |
| JP | 11-231983 | 8/1999 |
| JP | 2002-123341 | 4/2002 |
| JP | 2003-157129 | 5/2003 |
| KR | 1998-076638 | 9/1998 |
| KR | P1999-019373 | 3/1999 |
| KR | 2001-0011374 | 2/2001 |
| KR | 1020010011374 | 2/2001 |
| KR | 1020020069962 | 9/2002 |

OTHER PUBLICATIONS

English Translation (JP 2003157129).*
Notice to Submit Response (Office Action) in corresponding Korean Patent Application No. 10-2004-0085092 dated Feb. 13, 2006.

* cited by examiner

*Primary Examiner* — Thuan N Du
(74) *Attorney, Agent, or Firm* — Staas & Halsey LLP

(57) ABSTRACT

Provided are a method and apparatus for managing power of a portable information device. The apparatus includes: a display unit displaying a power management mode picture when a wake-up signal is input during a low-power consumption state of the portable information device; and a processing unit setting the portable information device again in the low-power consumption state when a user's input, as a response to the power management mode picture, is not received within a predetermined time after the power management mode picture is output to the display unit. Accordingly, even when a button on the portable information device is accidentally pressed, battery thereof can be prevented from being needlessly consumed.

13 Claims, 5 Drawing Sheets

METHOD AND APPARATUS FOR MANAGING POWER OF PORTABLE INFORMATION DEVICE

CROSS-REFERENCE TO RELATED APPLICATIONS

This application claims the benefit of Korean Patent Application No. 10-2004-0085092, filed on Oct. 23, 2004, in the Korean Intellectual Property Office, the disclosure of which is incorporated herein by reference.

BACKGROUND OF THE INVENTION

1. Field of the Invention

The present invention relates to a method and apparatus for managing power of a portable information device.

2. Description of the Related Art

Mobile terminals allow users to perform operations while they are moving. However, when a user carries a mobile terminal, in his/her pockets or bag, a power button or a hardware button installed on the mobile terminal can be accidentally pressed or a touch screen can be unintentionally touched, thereby turning on the mobile terminal. Also, the mobile terminal may be turned on by an alarm signal or a received phone call.

FIG. 1 is a flowchart showing a power state of a conventional portable information device according to the prior art. Referring to FIG. 1, when a user turns the power 120 on, the portable information device is changed to a normal operating state 130 from a no-power state 110. In the normal operating state 130, the user can use the portable information device to conduct communications or data processing.

When a battery voltage of the portable information device decreases below a predetermined threshold voltage while the device is being used, the portable information device enters a suspend state 140 in which the clock speed of a CPU (central processing unit) is reduced and only predetermined operations are performed such that power can be saved.

If the battery is not charged during this suspend state 140, the voltage level drops gradually and the portable information device goes back to the no-power state 110.

Meanwhile, in the suspend state 140, the portable information device may be unintentionally turned on by accidentally pressing the power button on the terminal. In such case, since the portable information device cannot identify whether the button is pressed intentionally or unintentionally, the terminal advances to the normal operating state 130 again and consumes an amount of power for a long time, resulting in the battery of the portable information device to be further exhausted.

FIG. 2 is a schematic configuration diagram of a power management device of the portable information device according to the prior art. Referring to FIG. 2, the power management device includes a CPLD (Complex Programmable Logic Device) 210 sending an interrupt signal to a CPU (Central Processing Unit) 220 by detecting battery voltage and a CPU 120 (FIG. 1) setting the portable information device to enter a suspend mode based on the interrupt signal sent by the CPLD 210. The CPLD 210 is connected to a voltage detecting unit 212 to detect if the voltage of a battery 211 falls below a predetermined threshold voltage. The CPLD 210 is connected to a GPIO (general purpose input-output) unit of the CPU so that the CPU 120 can detect a power failure when the voltage of the battery 211 falls below the predetermined threshold voltage and can enter a sleep mode (a suspend state).

When the CPU 220 receives the interrupt signal indicating that the battery voltage falls below the predetermined threshold voltage from the CPLD 210 through the GPIO, the CPU 220 sets the portable information device in the sleep mode, which is a low-power consumption state. For example, in the sleep mode, the clock speed of a CPU slows down and an I/O (input/output) device 240 including an LCD (liquid crystal display) and the like is changed from an active state to an inactive state.

As described above, the portable information device is switched from the sleep mode, which is a low-power state, to a normal operating state, in which a significant amount of power is consumed, when the portable information device is unintentionally activated, and therefore the battery voltage is needlessly consumed.

SUMMARY OF THE INVENTION

The present invention provides a method and apparatus for managing power of a portable information device, which can prevent a battery of the portable information device from being needlessly consumed when the portable information device is unintentionally woken up during a low-power state.

According to an aspect of the present invention, there is provided an apparatus for managing power of a portable information device, the apparatus including a display unit displaying a power management mode picture when a wake-up signal is input during a low-power consumption state of the portable information device, and a processing unit setting the portable information device in the low-power consumption state when a user's input, as a response to the power management mode picture is not received within a predetermined time after the power management mode picture is output to the display unit.

The processing unit may set the portable information unit in a normal operating state when the user's input is received within the predetermined time.

According to another aspect of the present invention, there is provided a method of managing power of a portable information device, the method including, generating a display when a wake-up signal is input during a low-power consumption state of the portable information device, and maintaining the portable information device in the low-power consumption state when a user input, as a response to the display, is not received within a predetermined time after the display is generated.

The method may further comprise setting the portable information device in a normal operating state when the user's input is received within the predetermined time.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
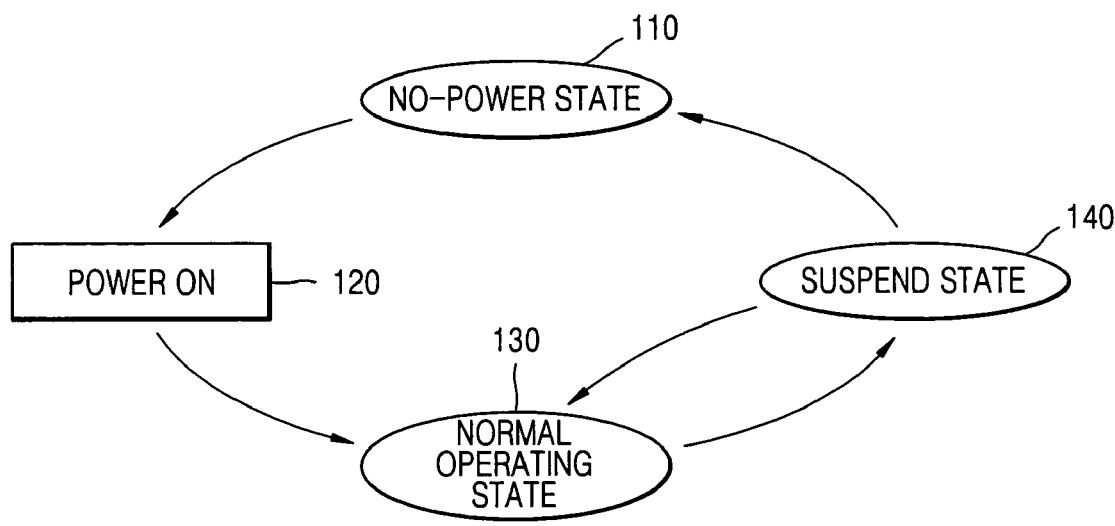
FIG. 1 is a flowchart illustrating a power state of a conventional portable information device according to the prior art.
Figure 2:
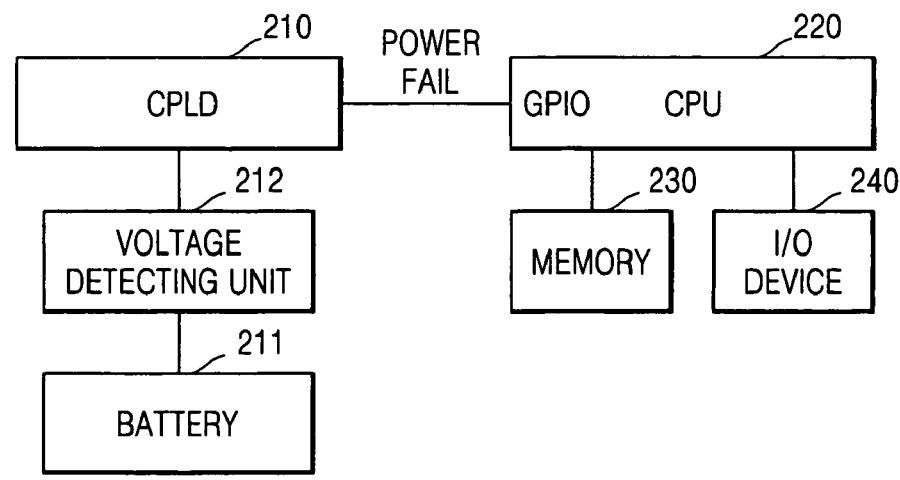
FIG. 2 is a schematic configuration diagram of a conventional power management unit of the portable information device according to the prior art.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
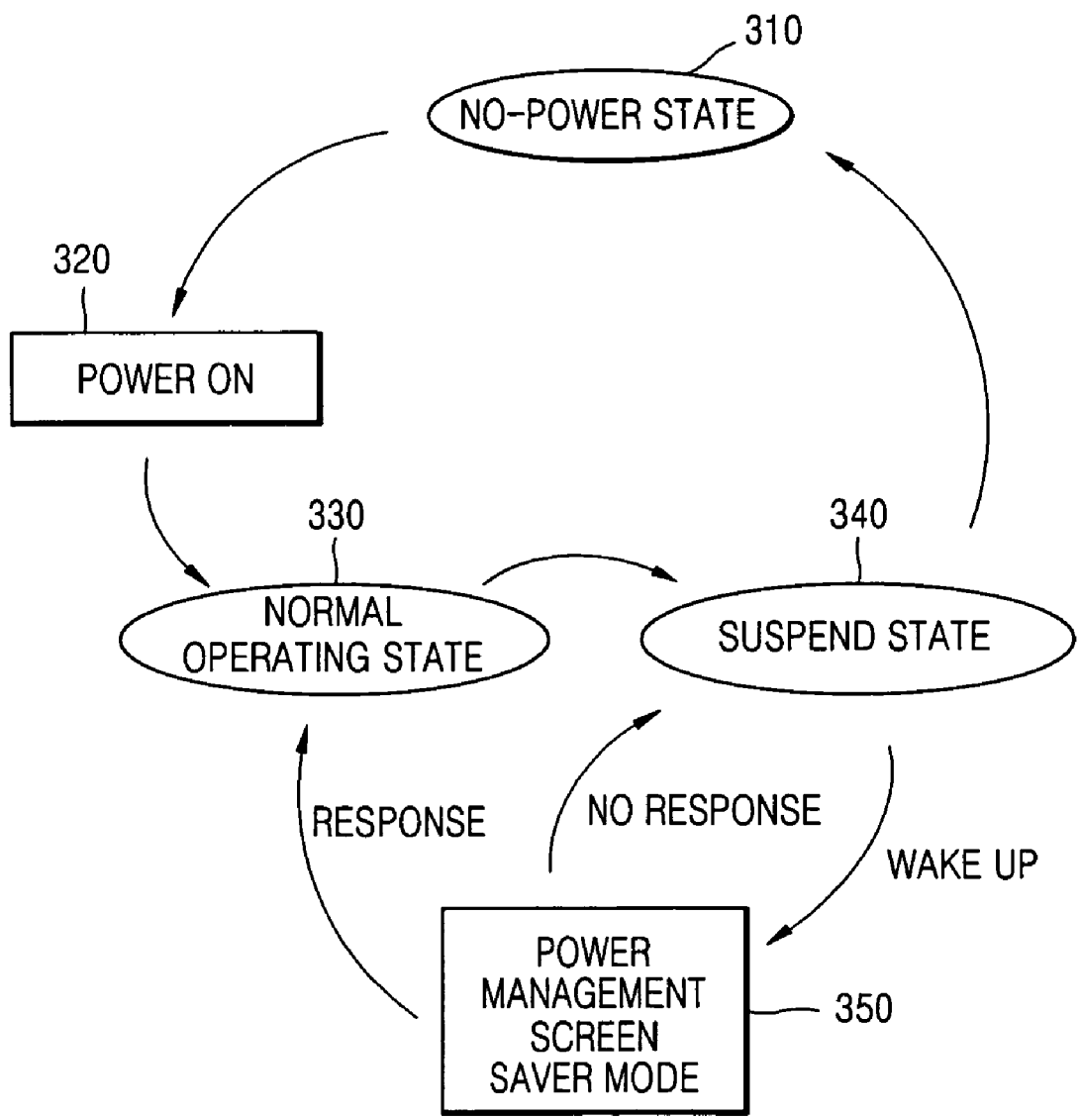
FIG. 3 is a flowchart illustrating a power state of a portable information device according to an embodiment of the present invention.

FIG. 3 is a flowchart illustrating a power state of a portable information device according to an embodiment of the present invention. In FIG. 3, the portable information device is shifted from a no-power state 310 to a normal operating state 330 when a user pushes a power on button 320. In the normal operating state 330, the user uses the portable information device to conduct communications or data processing.

Then, if power of the portable information device falls below a predetermined threshold level, a CPU (central processing unit) enters a suspend state 340 in which a clock speed of the CPU is reduced and only predetermined functions are performed, and thereby power consumption is reduced. The portable information device can be shifted from the suspend state 340 to the normal operating state 330 if the CPU is activated by a user's operations or the like.

However, to prevent the portable information device from needlessly staying in the normal operating state 330 when the device is woken up from the suspend state 340 irrespective of the user's intention, the portable information device is not directly shifted from the suspend state 340 to the normal operating state 330 but to a power management screen saver mode 350. In the power management screen saver mode 350, a predetermined picture for managing power is outputted to a display unit of the portable information device, and if a user's input is not received within a certain time after the picture is output, that is, there is no reaction, it is determined that the portable information device has been unintentionally woken up and the portable information device goes back to the suspend state 340. If the user's input is received through the display unit in response to the power management picture, the portable information device enters the normal operating state 330.

As described above, it is determined whether the portable information device is woken-up from the suspend state by the user's intention or by chance, and then if it is determined that the device is unintentionally woken up, the portable information device goes back to the suspend state immediately, therefore, the battery voltage can be prevented from being needlessly consumed.

Figure 4:
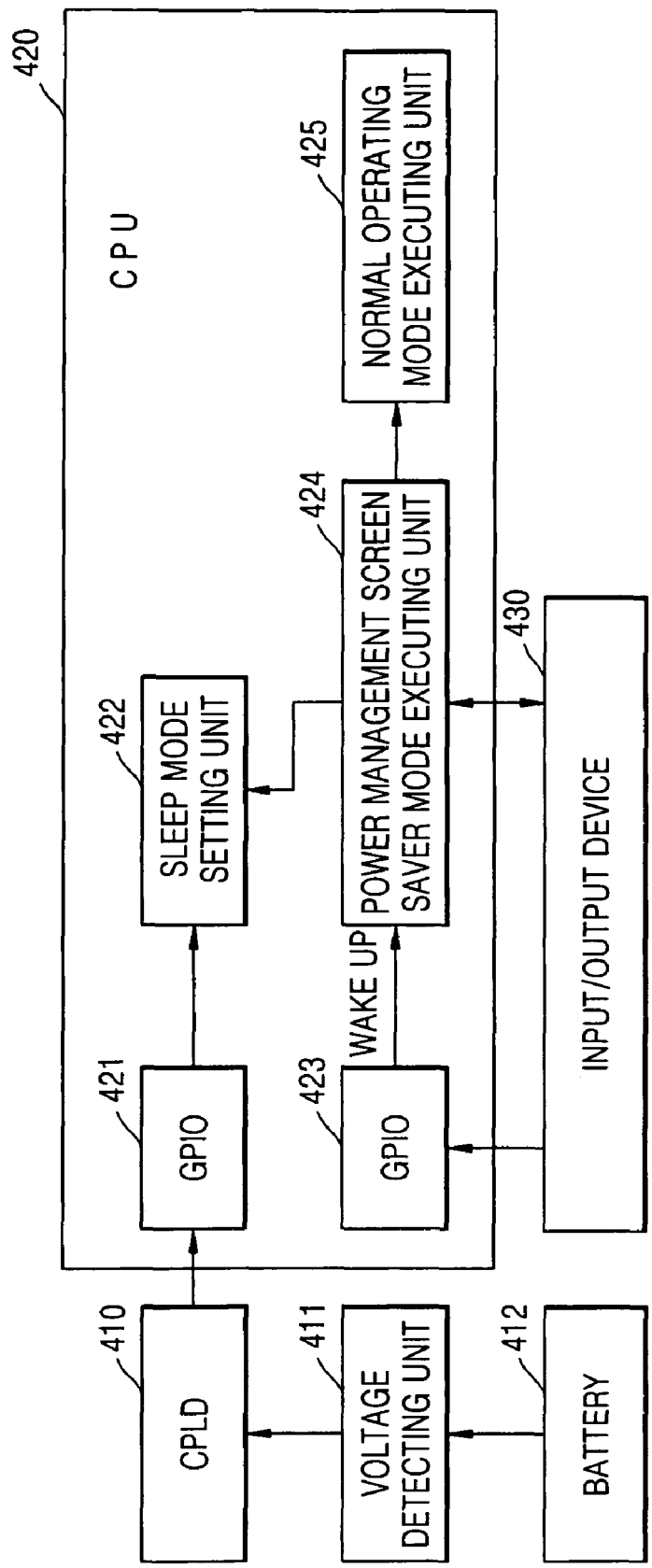
FIG. 4 is a configuration diagram of a power management unit of a portable information device according to an embodiment of the present invention.

FIG. 4 is a configuration diagram of a power management device of a portable information device according to an embodiment of the present invention. In FIG. 4, the power management device includes a CPLD 410 sending an interrupt signal to a CPU 420 by detecting a battery voltage, and the CPU 420 entering a suspend mode or executing a power management screen saver mode based on the interrupt signal of the CPLD 410.

The CPLD 410 is connected to a voltage detecting unit 411, which detects if a voltage of the battery 412 drops below a predetermined threshold voltage. The CPLD 410 is connected to a GPIO (general purpose input output) unit 421 of the CPU 420 in order to inform the CPU 420 of a power failure when the voltage of the battery 412 drops below the predetermined threshold voltage. In this case, the CPU enters a sleep mode.

The CPU 420 includes the GPIO unit 421, a sleep mode setting unit 422, a GPIO unit 423, a power management screen saver mode executing unit 424 and a normal operating mode setting unit 425, and is connected to an input/output device 430 and a memory (not shown).

The GPIO unit 421 receives the interrupt signal indicating the battery voltage drops below the predetermined threshold voltage from the CPLD 410 and sends a control signal to the sleep mode setting unit 422. The sleep mode setting unit 422 receives the control signal from the GPIO unit 421 and sets the portable information device to a low-power consumption mode. When the GPIO 423 receives a predetermined wake-up signal from the input/output device 430, the GPIO unit 423 transmits the wake-up signal to the power management screen saver mode executing unit 424. The wake-up signal may be generated when a certain button on an input unit of the portable information device is pressed or a phone call is received. When the power management screen saver mode executing unit 424 receives the control signal from the GPIO unit 423, the power management screen saver mode executing unit 424 outputs a power management mode picture to a display unit of the input/output device 430.

Figure 6:
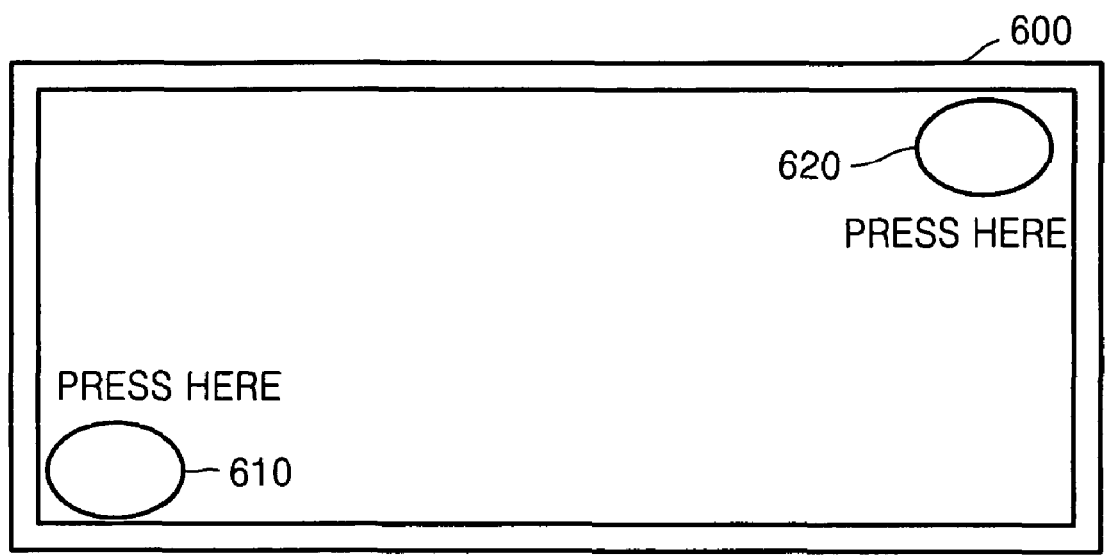
FIG. 6 is a diagram illustrating an example of a power management screen according to an embodiment of the present invention.

The power management mode picture is for confirming if the wake-up signal is generated intentionally or not. FIG. 6 illustrates an example of such power management mode picture. In FIG. 6, two areas 610 and 620 for receiving the user's input are on the power management picture 600. Below these areas, a guidance message, which says "Press here" is indicated. If the user is watching the picture, the user may press either or both of the areas to confirm that he/she is operating the portable information device. If the user is not watching the picture at that moment, neither of the two areas is pressed. The picture illustrated in FIG. 6 is an example, and alternative forms of the picture for receiving a user's input can be variously made. Further, the portable information device may receive the user's input by a predetermined button formed thereon instead of by a touch screen.

Therefore, when the user's input is not received in response to the picture within a predetermined time, for example, 10 seconds after the power management picture is output, the power management screen saver mode executing unit 424 determines that the wake-up signal is unintentionally generated and sends a control signal to the sleep mode setting unit 422 to return the portable information device to the sleep mode. The predetermined time may be, for instance, 5 to 30 seconds. When receiving the control signal, the sleep mode setting unit 422 sets the sleep mode in which the portable information device consumes less power.

Meanwhile, when the power management screen saver mode executing unit 424 receives the input from the user within the predetermined time, the power management saver mode executing unit 424 sends a control signal to the normal operating mode executing unit 425 for the portable information device to enter the normal operating mode.

Figure 5:
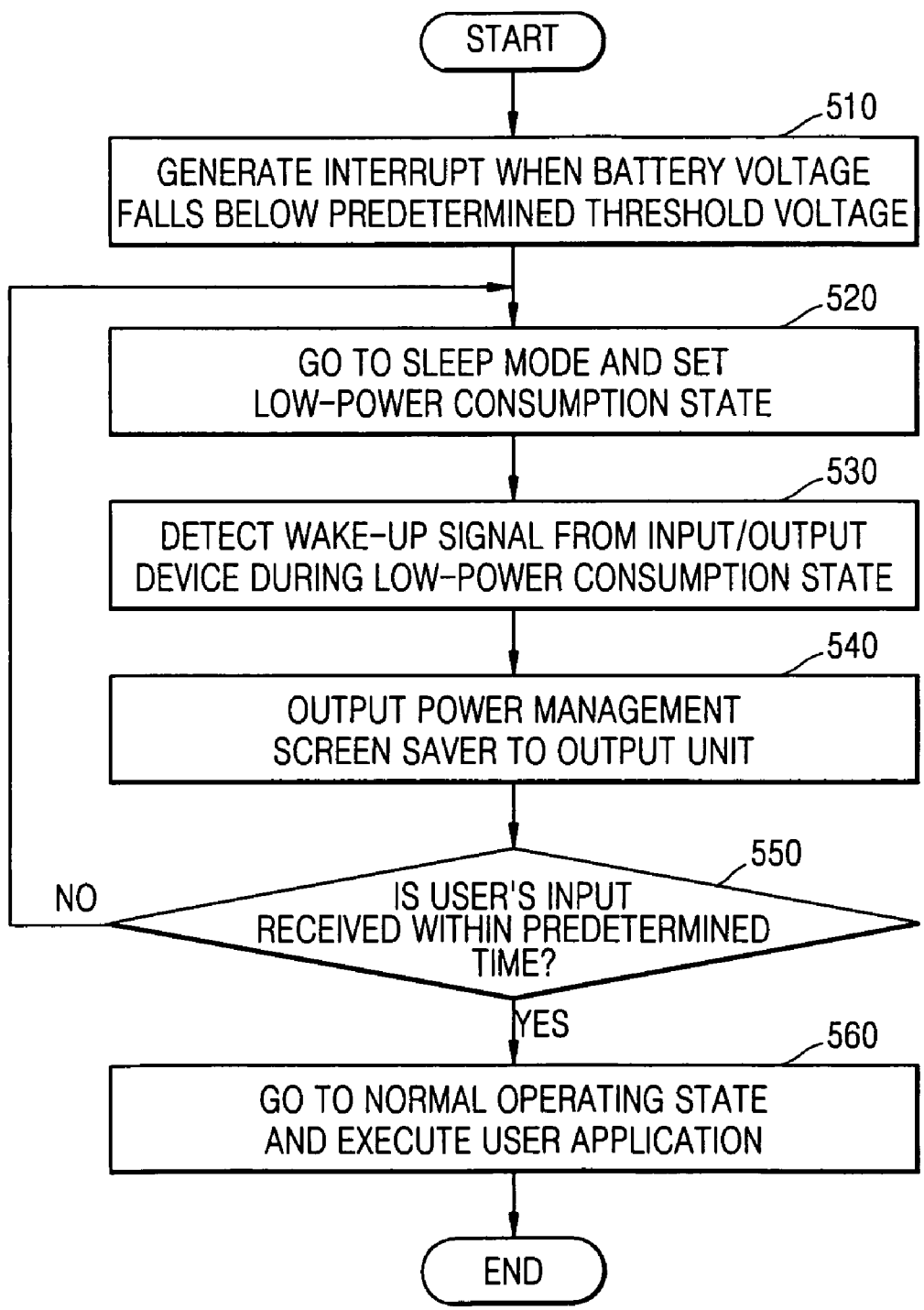
FIG. 5 is a flowchart illustrating a power management operation of a portable information device according to an embodiment of the present invention.

FIG. 5 is a flowchart showing a power management operation of a portable information device according to an embodiment of the present invention. In FIG. 5, when the battery voltage falls below the predetermined threshold voltage, an interrupt signal is generated (operation 510).

Then, when the CPU of the portable information device receives the interrupt signal, the CPU enters the sleep mode and sets the low-power consumption state (operation 520). If the user does not charge the battery, power is gradually consumed in the low-power state.

When the CPU detects the wake-up signal from the input/output device during the low-power consumption state (operation 530), the CPU outputs the power management screen saver to the output unit (operation 540).

Thereafter, the CPU determines whether the user's input is received within a predetermined time after the power management screen saver is output (operation 550).

When it is determined that the user's input is not received within the predetermined time, the CPU enters again the sleep mode and sets the low-power consumption state (operation 520).

When it is determined that the user's input is received within the predetermined time, the CPU goes to the normal operating state and executes a user application and the like (operation 560).

In the present embodiment, when the user's input is not received within the predetermined time, the low-power consumption state is set, but in some cases, a power-off state may be set.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As describe above, when a portable information device is unintentionally woken-up by, for example, by an alarm signal, a received phone call, accidentally pressing a button or touching a touch screen or while a user is absent, the portable information device is forced to enter the low-power consumption state, and therefore, the wake-up time, which has conventionally lasted for three to five minutes, is reduced to 5 to 30 seconds, thereby preventing needless power consumption.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for managing power of a portable information device, the apparatus comprising:
    a display unit to display a power management mode picture in response to a wake-up signal that is input during a low-power consumption state of the portable information device, the power management mode picture occupying a portion of an image displayed by the display unit; and
    a processing unit to maintain the portable information device in the low-power consumption state unless a user's input in an area of the power management mode picture, as a response to the power management mode picture, is received within a predetermined time after the power management mode picture is output to the display unit,
    wherein the wake-up signal is generated when a phone call is received.

2. The apparatus of claim 1, wherein the processing unit sets the portable information unit in a normal operating state when the user's input is received within the predetermined time.

3. The apparatus of claim 1, wherein the display unit comprises a touch-screen display and the user's input being received upon the user pressing the two icons on the touch-screen display.

4. The apparatus of claim 3, wherein the user's input is received upon the user simultaneously pressing the two icons on the touch-screen display.

5. The apparatus of claim 1, wherein the power management mode picture includes at least one area to receive user's input to determine whether the wake-up signal is input according to the user's intention.

6. A method of managing power of a portable information device, the method comprising:
    placing the portable information device in a suspend state when power of the portable information device falls below a pre-determined threshold;
    generating a power management mode picture as a predetermined portion of an image displayed on a display and temporarily setting the portable information device in a power management screen saver mode in response to a wake-up signal that is input during the suspend state; and
    returning the portable information device to the suspend state when a user input, as a response to the power management mode picture, is not received in an area of the power management mode picture within a predetermined time after the power management mode picture is generated,
    wherein the wake-up signal is generated when a phone call is received.

7. The method of claim 6, further comprising:
    setting the portable information device in a normal operating state when the user's input is received within the predetermined time.

8. An apparatus for managing power of a portable information device, the apparatus comprising:
    a complex programmable logic device (CPLD) unit to send an interrupt signal based on whether a battery voltage drops below a predetermined threshold voltage;
    a processing unit to receive the interrupt signal and to enter a suspend mode;
    a first general purpose input-output (GPIO) unit to receive the interrupt signal from the CPLD indicating the battery voltage drop being below the predetermined threshold voltage and sending a control signal;
    a sleep mode setting unit to receive the control signal from the first GPIO unit and to set the portable information device to a low-power consumption mode;
    an input/output device (I/O) device unit to generate a predetermined wake-up signal;
    a second GPIO unit to receive and to transmit the wake-up signal; and
    a power management screen saver mode executing unit to receive the transmitted wake-up signal from the second GPIO unit and to execute a power management screen saver mode while outputting a power management mode picture to a display unit of the I/O device unit, the power management mode picture occupying a predetermined portion of an image displayed on the display unit, wherein the wake-up signal is generated when a phone call is received.

9. The apparatus for managing power of a portable information device according to claim 8, wherein the power management mode picture indicates if the wake-up signal is generated intentionally.

10. The apparatus for managing power of a portable information device according to claim 8, wherein the power management screen saver mode executing unit returns the portable information device to the low-power consumption state when a user input, as a response to the power management mode picture, is not received within a predetermined time after the power management mode picture is generated.

11. A method of managing power of a portable information device the method comprising:

displaying a power management mode picture as a predetermined portion of an image displayed on a display in response to a wake-up signal that is input during a low-power consumption state of the portable information device;

maintaining the portable information device in the low-power consumption state unless a user's input in an area of the power management mode picture, as a response to the power management mode picture, is received within a predetermined time after the power management mode picture is output, wherein the wake-up signal is generated when a phone call is received.

12. An apparatus for managing power of a portable information device, the apparatus comprising:

a sleep mode setting unit setting the portable information device in a suspend state when power of the portable information device falls below a pre-determined threshold;

a display unit displaying an image;

a power management screen saver mode executing unit generating a power management mode picture as a portion of the image displayed by the display unit and temporarily setting the portable information device in a power management screen saver mode in response to a wake-up signal that is input during the suspend state; and a normal operating mode setting unit returning the portable information device to the suspend state when a user input, as a response to the power management mode picture, is not received in an area of the power management mode picture within a predetermined time after the power management mode picture is generated, wherein the wake-up signal is generated when a phone call is received.

13. An apparatus for managing power of a portable information device, the apparatus comprising:

a display unit to display a power management mode picture when a wake-up signal is input during a low-power consumption state of the portable information device, the power management mode picture occupying a portion of an image displayed by the display unit; and a processing unit to set the portable information device in a normal operating state when a user's input in an area of the power management mode picture, as a response to the power management mode picture, is received within a predetermined time after the power management mode picture is output to the display, wherein the wake-up signal is generated when a phone call is received.

* * * * *